Oct. 10, 1939.　　　　K. PERKINS　　　　2,175,852
TURRET GUN MOUNT
Filed Dec. 23, 1937　　　3 Sheets—Sheet 1

INVENTOR
KENDALL PERKINS.
BY
ATTORNEY

Oct. 10, 1939.　　　　K. PERKINS　　　　2,175,852

TURRET GUN MOUNT

Filed Dec. 23, 1937　　　3 Sheets—Sheet 2

INVENTOR
KENDALL PERKINS.
BY
ATTORNEY

Oct. 10, 1939.                K. PERKINS                2,175,852
                            TURRET GUN MOUNT
                         Filed Dec. 23, 1937        3 Sheets-Sheet 3
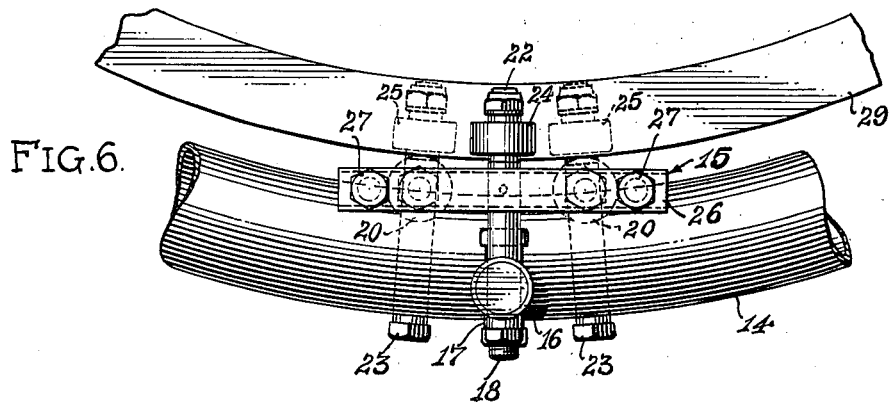
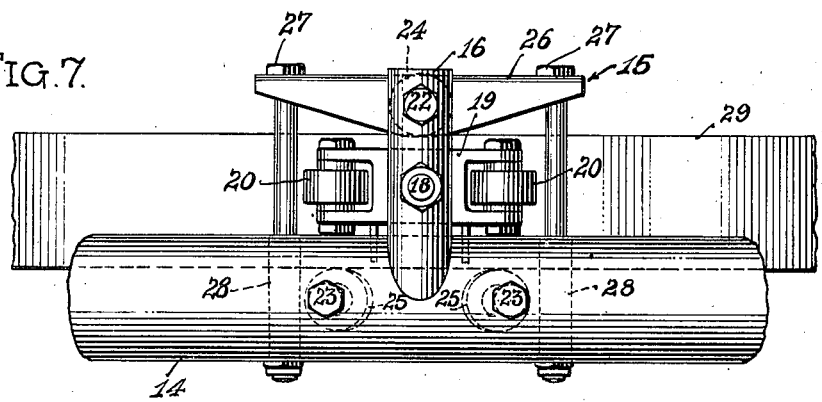
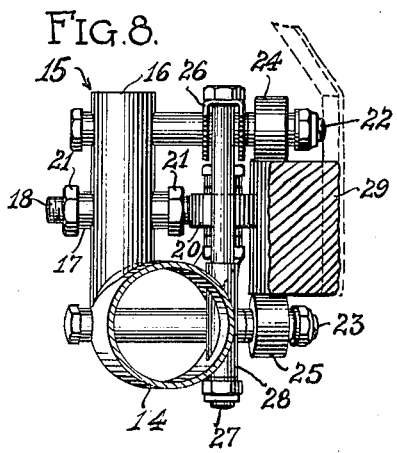
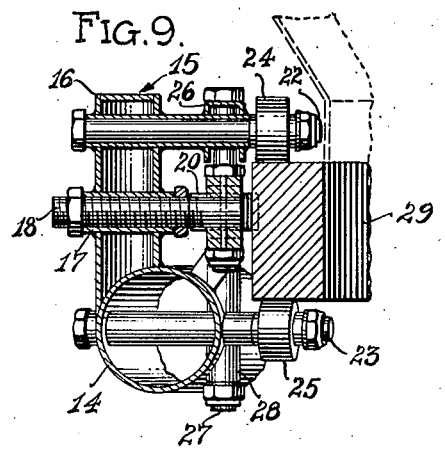
INVENTOR
KENDALL PERKINS.
BY
ATTORNEY Patented Oct. 10, 1939

2,175,852

UNITED STATES PATENT OFFICE 2,175,852

TURRET GUN MOUNT

Kendall Perkins, Clayton, Mo., assignor to Curtiss-Wright Corporation, a corporation of Delaware Application December 23, 1937, Serial No. 181,256

4 Claims. (Cl. 89—36)

This invention relates to aircraft armament, being particularly concerned with an improved type of transparent gun turret for use in conjunction with flexibly mounted machine guns. Rotatable gun turrets used in the past have usually comprised substantially hemispherical domes projecting from an aircraft body, the domes being mounted for bodily rotation, but these offer an undue amount of drag due to their poor streamline form. Other gun turrets with better streamlining characteristics, have been provided with fixed fairings in certain sectors of the turret plan form, but such fairings obstruct the field of gun fire in certain sectors.

An object of this invention is to provide a gun turret of improved streamline form, and to provide one which is arranged for rotation throughout a full 360° to afford gun fire possibilities in any position of adjustment.

A further object is to provide a gun turret which, though inherently faired into the fuselage contour, will provide adequate room within the turret for the handling of a mounted gun, and likewise to afford adequate room for a gunner.

A further object is to provide a gun turret support independent of the skin covering of the aircraft fuselage, certain portions of the turret coacting with the plane of the fuselage skin to provide a streamlined fairing.

Still another object is to provide an improved form of simplified mounting for a rotatable turret and gun mount.

Further objects will be apparent from a reading of the annexed specification and claims, together with an examination of the accompanying drawings, in which:

Fig. 6 is an enlarged fragmentary plan of the turret support;

Fig. 7 is a fragmentary elevation of the turret support;

Fig. 8 is a fragmentary elevation of the turret support showing the supporting rail and gun ring in section; and Fig. 9 is a detail section through the support, gun ring and gun ring supporting mechanism.

Figure 1:
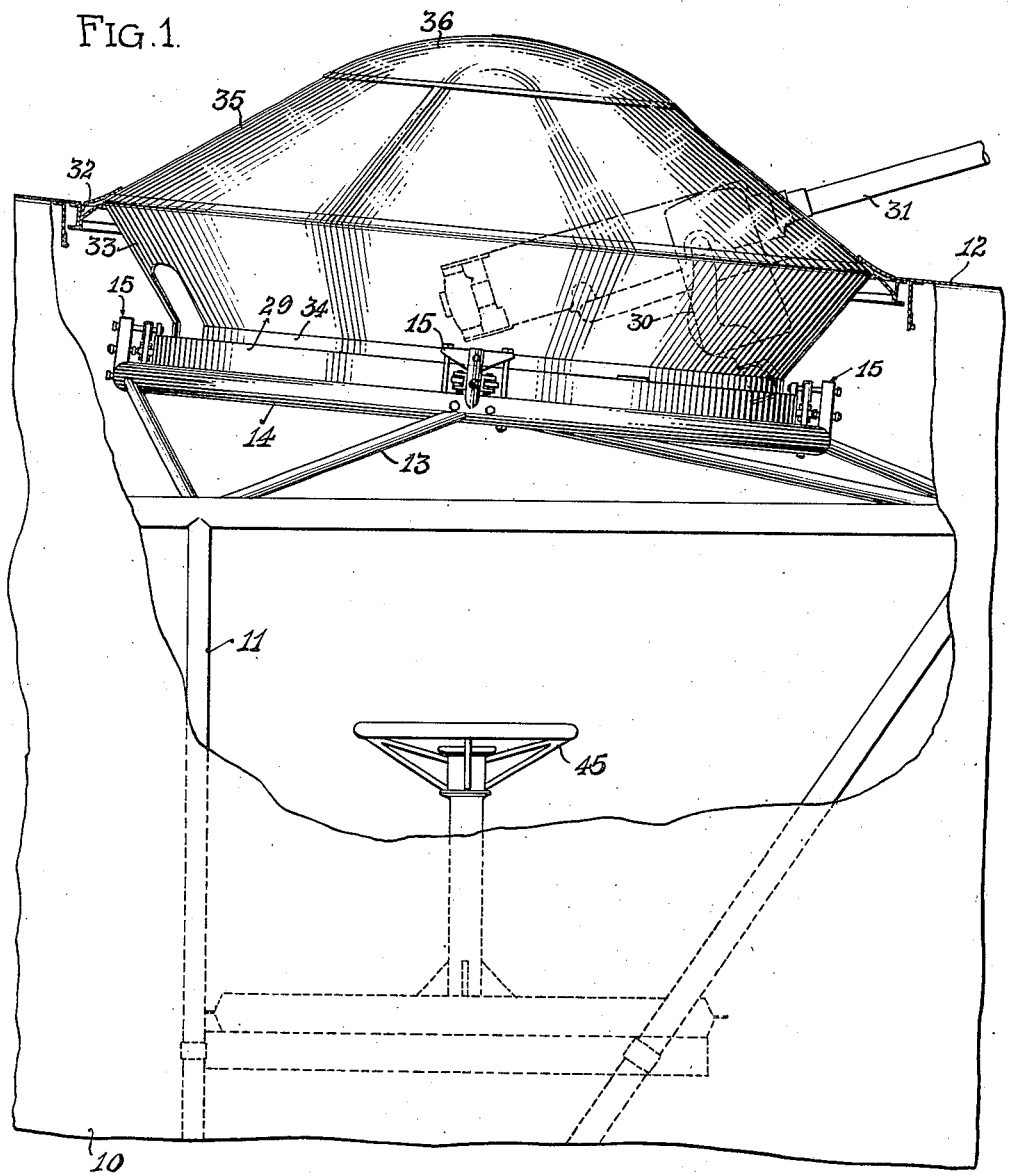
Fig. 1 is a fragmentary elevation of an aircraft fuselage, partly broken away, to show the turret of this invention.
Figure 2:
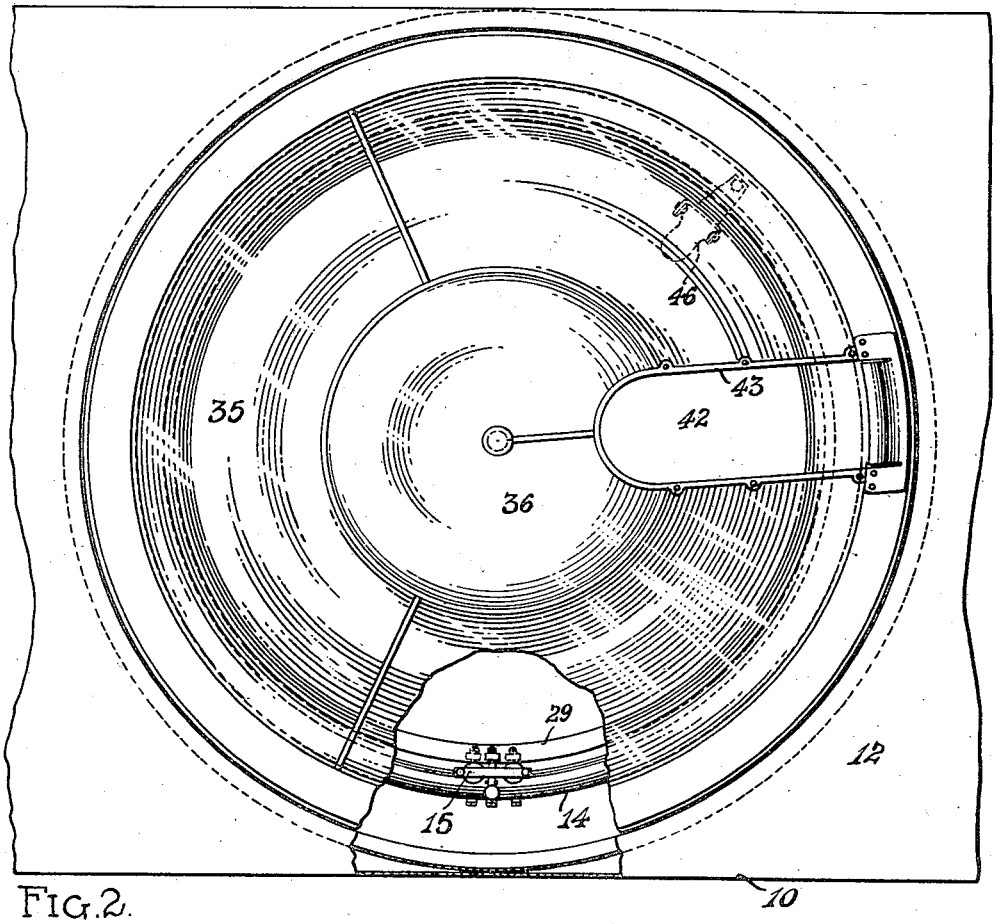
Fig. 2 is a fragmentary plan of the turret.

Referring to the drawings, 10 represents an aircraft fuselage having a conventional skeleton framework 11 and an upper skin 12. By suitable braces 13, a tubular ring 14 is mounted to the skeleton 11 in a substantially horizontal plane, said ring carrying circumferentially spaced mounting devices 15 shown in detail in Figs. 6 to 9. The devices 15 are similar and comprise a post 16 welded to the ring 14, said post being provided with a bushing 17 through which a bolt 18 passes, the bolt having at its inner end a cross-yoke 19 carrying rollers 20 whose axes are substantially vertical. By adjustments of the nuts 21 on the bolt 18, the rollers 20 may be moved radially with respect to the ring. The post 16 and the ring 14 are likewise provided with inwardly projecting spindles 22 and 23 upon which rollers 24 and 25 are respectively mounted. The spindle 22 carries a cross-yoke 26 through which bolts 27 pass to engage bushings 28 fixed to the ring 14, these bolts 27 serving to adjust the distance between the rollers 24 and 25. A rectangular ring 29 is concentric with the tubular ring 14 and is carried by the several devices 15, the upper and lower surfaces of the ring 29 respectively engaging the rollers 24 and 25, and the outer surface of the ring 29 engaging the rollers 20. Thus, the ring 29 is freely rotatable within the support ring 14 and the clearances in the several devices 15 may be so adjusted as to prevent undue backlash or freedom for the ring 29.

As indicated in Fig. 1, the ring 29 carries a gun adapter 30 upon which a gun 31 is mounted for elevation and for limited traverse.

It will be noted that the ring 14 is disposed well below the upper surface 12 of the fuselage, the latter having an opening 32 concentric with the ring 14 and of considerably greater diameter. A lower turret portion 33 is shaped like the frustum of a cone, the smaller diameter thereof including a flange 34 attached to the inner face of the ring 29. The lower turret portion 33 flares upwardly and outwardly so that its upper edge is substantially coplanar with the fuselage surface 12. This lower turret portion 33 may be opaque, and is preferably fabricated from sheet metal. An upper turret portion 35 comprises a frustum of a cone capped by a spherical segment 36, the elements 35 and 36 both being of transparent material, and the lower edge of the element 35 being attached to the upper edge of the element 33. The element 35, though conical in form, is relatively flat, as shown, and avoids an abrupt departure from the plane of the fuselage covering 12 with consequent reduction in air flow interference over the fuselage. By virtue of the large diameter of the opening 32 in the fuselage, adequate space is left within the turret comprising the elements 33, 35 and 36 to eliminate undue crowding of the gunner, the gun and necessary accessories, while retaining the diameter of the mount proper including the elements 14 and 29 within reasonable limits.

Figures 3, 4, 5:
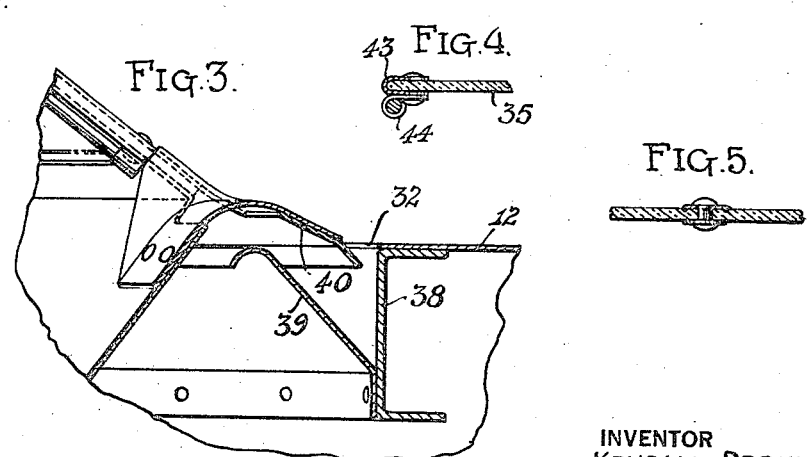
Fig. 3 is an enlarged detail section through a portion of the turret and aircraft skin.
Fig. 4 is a fragmentary section through a portion of the turret adjacent the gun port.
Fig. 5 is a detail section through a portion of the turret.

As indicated in Fig. 3, the fuselage opening 32 is bordered by a structural member 38 to which an annular gutter 39 is attached, the turret being provided with an annular apron 40 overlying the gutter 39 and having small clearance with respect to the edge of the opening 32. Thus, under adverse weather conditions, rain or snow may not enter the cockpit, yet complete freedom for turret turning is permitted. The apron 40 likewise improves the general streamlined conformation of the turret assembly. If desired, suitable drains may be incorporated in the channel formed between the member 38 and the gutter 39.

The turret elements 35 and 36 are provided with a slot 42 bordered by a metal strip 43 through which the barrel of the gun 31 may project for firing. The strip 43 is reinforced with a bead 44, as shown in Fig. 4, to provide greater rigidity adjacent the edge of the opening 42.

Within the cockpit, as shown in Fig. 1, and beneath the turret, a suitable seat 45 is disposed for the accommodation of a gunner. Alternatively, by means well known in the art, the gunner's seat may be supported upon the rail 29 for rotation therewith. A latch mechanism, diagrammatically indicated at 46, is mounted upon the rail 29, having a member engageable with the tubular ring 14 for locking the turret in any desired rotational position.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In combination with an aircraft fuselage, an annular support member inwardly spaced from the fuselage surface and intermediate the fuselage length, said surface having an opening concentric with and of larger diameter than the support member, a ring concentric with and carried by said support member for rotation relative thereto, an upwardly and outwardly flaring element terminating substantially at the edge of said fuselage opening, and a flat conical transparent turret carried by said member having its cone base substantially in the plane of the fuselage surface, said turret affording a substantially streamlined protuberance above the fuselage surface.

2. In a gun turret for aircraft having a substantially flat surface, a support ring inwardly spaced from the surface and lying in a plane parallel thereto, said surface having an opening concentric with and of larger diameter than said ring, an annular member in rotatable engagement with the ring, outwardly flaring elements carried by the member and terminating substantially at the edge of the surface opening, and a truncated conical transparent turret having its base secured to said elements, the turret rising above said surface.

3. In a gun turret for aircraft having a substantially flat surface, a support ring inwardly spaced from the surface and lying in a plane parallel thereto, said surface having an opening concentric with and of larger diameter than said ring, an annular member in rotatable engagement with the ring, outwardly flaring elements carried by the member and terminating substantially at the edge of the surface opening, a truncated conical transparent turret having its base secured to said elements, the turret rising above said surface, and an annular apron substantially bridging the space between the surface opening edge and the turret edge.

4. In a gun turret for aircraft having a substantially flat surface, a support ring inwardly spaced from the surface and lying in a plane parallel thereto, said surface having an opening concentric with and of larger diameter than said ring, an annular member in rotatable engagement with the ring, outwardly flaring elements carried by the member and terminating substantially at the edge of the surface opening, a truncated conical transparent turret having its base secured to said elements, the turret rising above said surface, an annular apron substantially bridging the space between the surface opening edge and the turret edge, and an annular gutter secured to the aircraft within said surface opening and lying beneath said apron to collect water which may pass between the edge of the apron and the edge of said opening.

KENDALL PERKINS.